United States Patent
Grubbs et al.

(10) Patent No.: US 6,623,063 B1
(45) Date of Patent: Sep. 23, 2003

(54) CONVERTIBLE TOP TACK STRIP AND MOUNTING METHOD

(75) Inventors: Harold M. Grubbs, Adrian, MI (US); Richard L. Birdwell, Adrian, MI (US)

(73) Assignee: Dura Convertible Systems, Inc., Troy, MI (US)

( * ) Notice: Subject to any disclaimer, the term of this patent is extended or adjusted under 35 U.S.C. 154(b) by 0 days.

(21) Appl. No.: 09/914,895

(22) PCT Filed: Mar. 17, 2000

(86) PCT No.: PCT/US00/07074
§ 371 (c)(1),
(2), (4) Date: Sep. 4, 2001

(87) PCT Pub. No.: WO00/54998
PCT Pub. Date: Sep. 21, 2000

Related U.S. Application Data
(60) Provisional application No. 60/124,965, filed on Mar. 18, 1999.

(51) Int. Cl.[7] .................................................. B60J 7/12
(52) U.S. Cl. ................................................. 296/107.09
(58) Field of Search .......................... 296/107.05, 121, 296/124, 135, 107.09, 107.12

(56) References Cited

U.S. PATENT DOCUMENTS

| | | | | |
|---|---|---|---|---|
| 2,649,330 A | * | 8/1953 | Schamel et al. | 296/121 |
| 2,746,791 A | * | 5/1956 | Gosselin | 296/107.05 |
| 2,954,999 A | * | 10/1960 | Fingerman et al. | 296/121 |
| 5,267,771 A | * | 12/1993 | Rothe | 296/121 |
| 5,395,152 A | * | 3/1995 | Skornicka et al. | 296/124 |

FOREIGN PATENT DOCUMENTS

JP 61-268520 A * 11/1986 ............ 296/107.09

* cited by examiner

Primary Examiner—D. Glenn Dayoan
Assistant Examiner—Paul Chenevert
(74) Attorney, Agent, or Firm—David A. Greenlee

(57) ABSTRACT

A flexible tack strip (30, 30') is provided for mounting the rear hem (28) of a convertible top cover (22) to a vehicle body (12). The tack strip (30, 30') is preferably glass-filled plastic material (30') and is sufficiently flexible to enable deformation and insertion through the top storage compartment opening (16) when the topstack (18) is being installed on the vehicle body (12). The tack strip (30, 30') has at least one stop member (38) which engages a stop clip (42) mounted on the body to limit the upward and forward movement of the tack strip (30, 30') to secure the cover hem (28) and tension the cover (22) when the top is raised. An optional spring latch (46) can be included adjacent each stop clip to trap the tack strip when installed.

10 Claims, 3 Drawing Sheets

CONVERTIBLE TOP TACK STRIP AND MOUNTING METHOD

This application claims the benefit of Provisional application Ser. No. 60/124,965, filed Mar. 18, 1999.

BACKGROUND OF THE INVENTION

This invention relates generally to vehicle convertible tops and, more particularly, to an improved topstack tack strip and method of mounting the tack strip on the vehicle body.

Conventional convertible topstacks have a rear top fabric hem that is stapled to a tack strip that comprises a plastic insert in an aluminum extruded holder that is then secured by as many as 19 bolts to the vehicle body after the topstack frame is mounted to the body. This bolting process requires a substantial amount of manual labor and judgment to assure that the tack strip is properly mounted. As such, it is a time-consuming and expensive assembly operation.

It would be desirable to provide an improved tack strip and to simplify the mounting of it on the vehicle body.

SUMMARY OF THE INVENTION

It is therefore an object of this invention to provide an improved tack strip and to simplify the mounting of it on the vehicle body.

In one aspect, this invention features a convertible vehicle having a body opening to a top storage compartment which stores a topstack. The topstack comprises a collapsible frame with a fabric cover and is raised and lowered through this opening and is initially inserted through the opening for attachment of its mounting brackets to the vehicle body. The top cover has a rear hem that is secured to a U-shaped tack strip that is sufficiently flexible to partially collapse to enable insertion through the body opening. The tack strip has one or more stop members mounted on it which engage mating stop clips on the body adjacent the opening. When the top is raised, the stop member engages the top and front lip of the stop clip to limit upward and forward movement of the tack strip to anchor the top cover rear hem and tension the cover.

The vehicle body has a water drain trough spaced below the lip of the body opening. Spring latch clips or other retainers are optionally placed adjacent the drain trough beneath the tack strip to latch the tack strip in place and to limit lowering movement of the tack strip.

The tack strip is preferably a unitary piece of glass-filled plastic to provide the needed flexibility.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
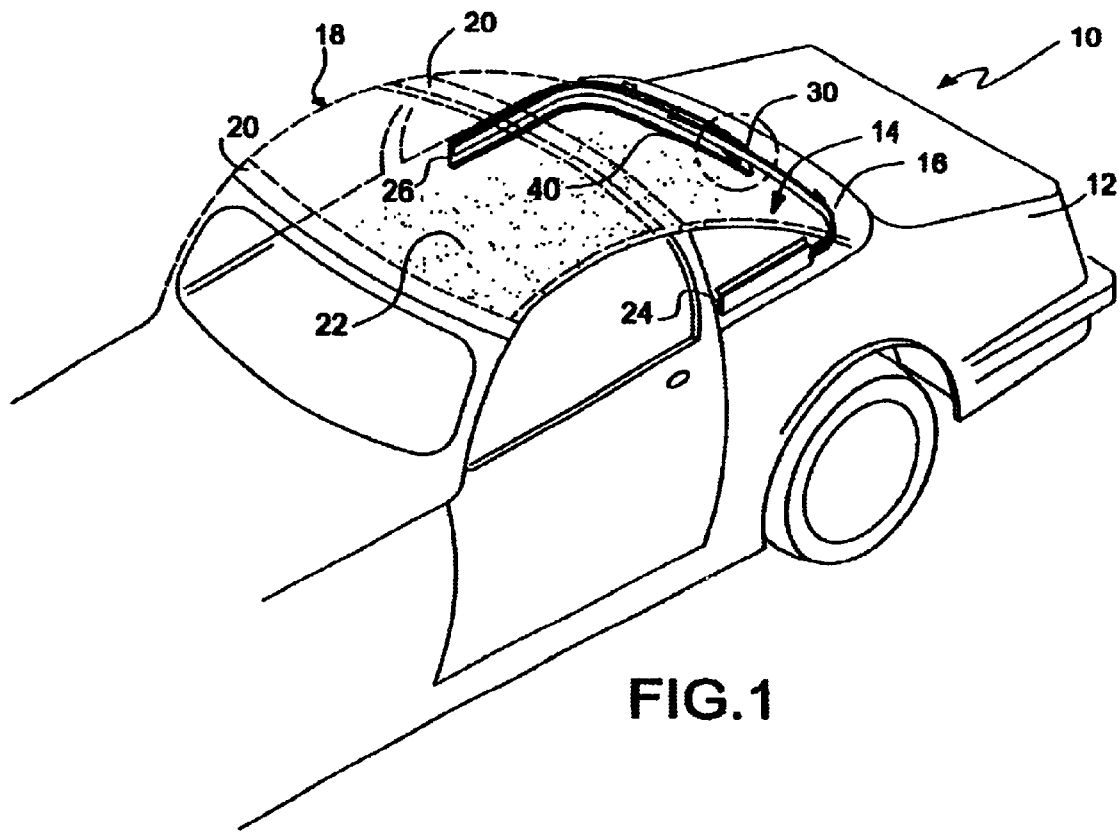
FIG. 1 is a perspective view of a convertible vehicle having a topstack that has a tack strip and mounted on the body according to this invention.

Referring now to FIG. 1 of the drawings, a convertible vehicle 10 has a body 12 that has an opening 14 into a top storage compartment 15. Opening 14 is bounded by a peripheral lip 16. A topstack 18 includes an articulated collapsible frame 20 comprising side rails and cross bows which support a fabric cover 22 when the topstack is raised. The frame 20 includes a pair of spaced mounting brackets 24 and 26 that are bolted or otherwise secured to the insides of body 12 below opening 14 within top storage compartment 15 to mount the topstack securely to the vehicle body.

Figures 3, 4:
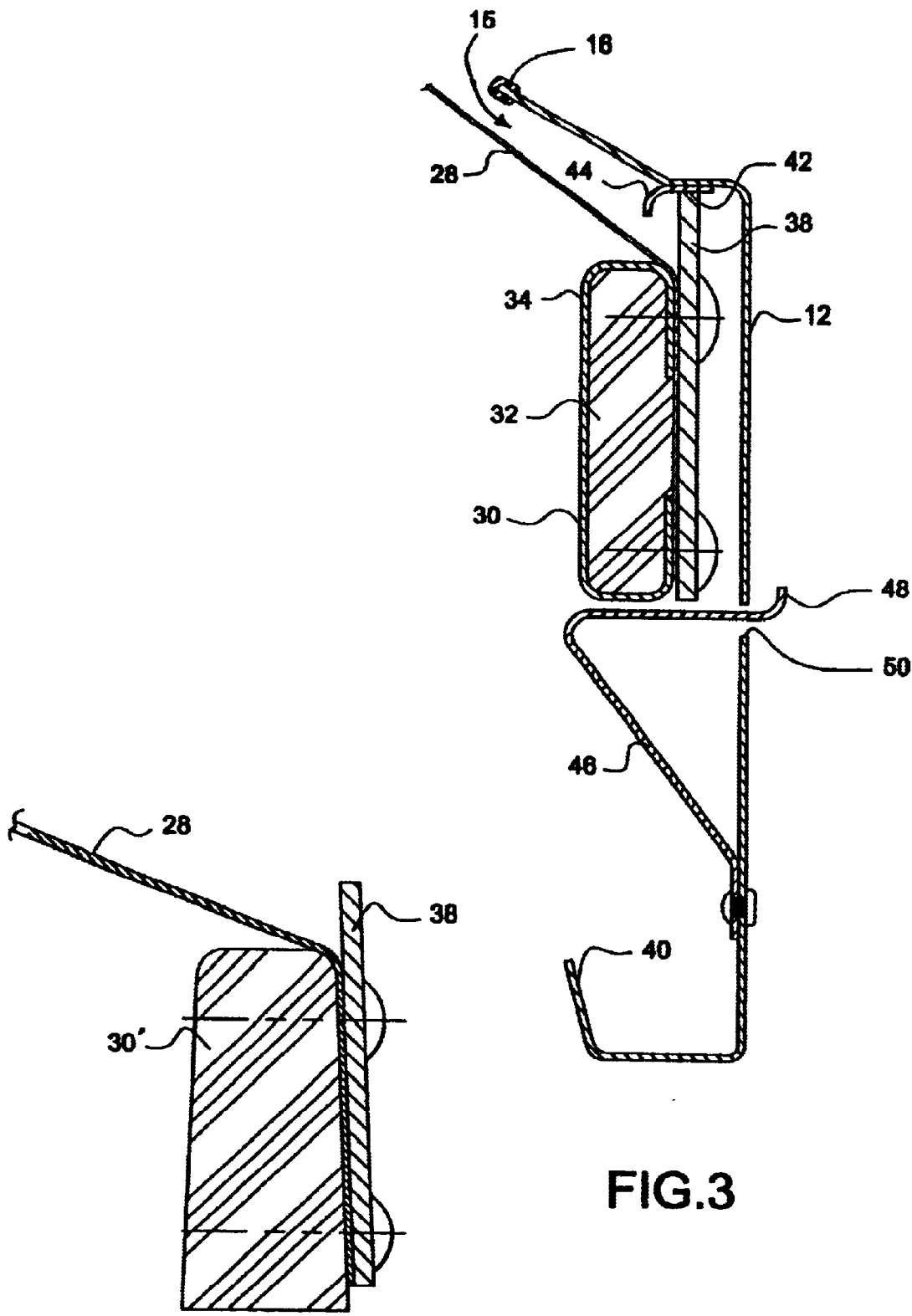
FIG. 3 is an enlarged sectional view and illustrating the optional latch of this invention.
FIG. 4 is a sectional view of a preferred form of tack strip according to this invention.
Figure 5:
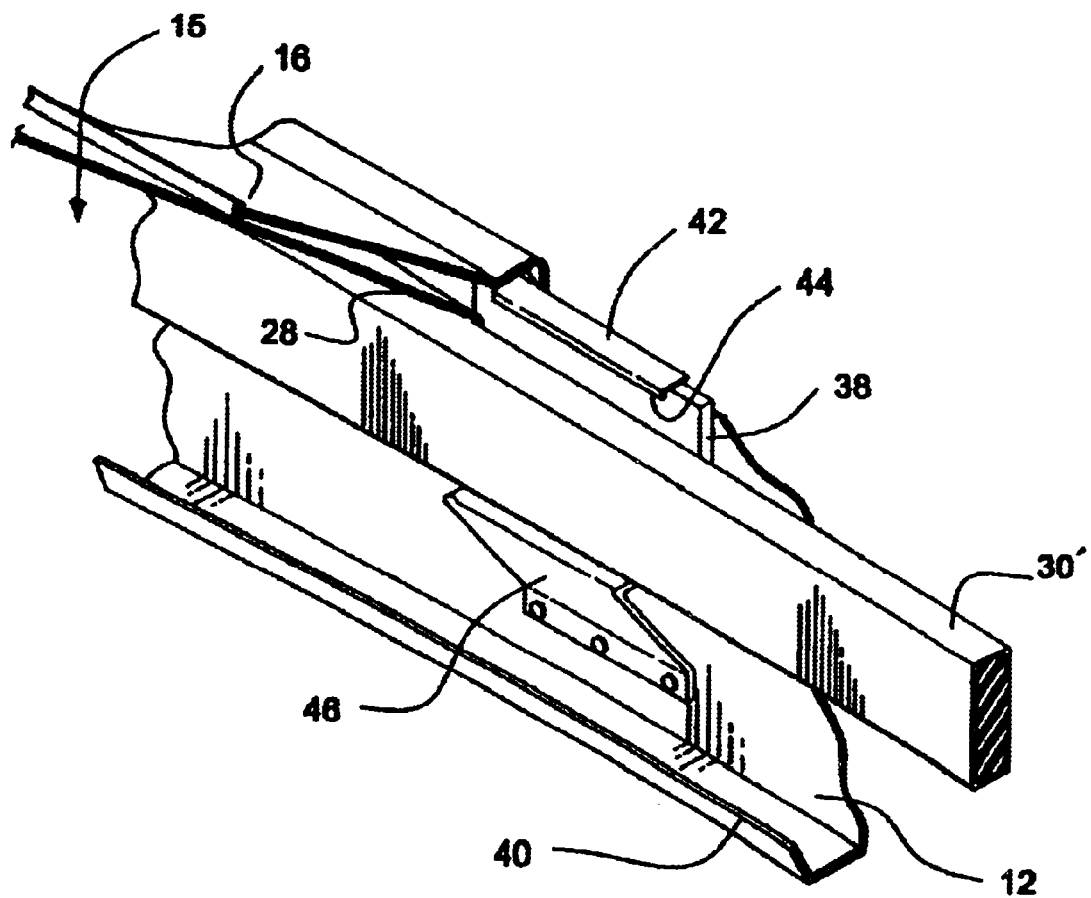
FIG. 5 is an enlarged detail view of the circled portion of FIG. 1.

Referring to FIGS. 3–5, top cover 22 includes a rear hem 28 that is stapled or otherwise secured to a tack strip 30. A drain trough 40 is located in storage compartment 15 below lip 16.

Figure 2:
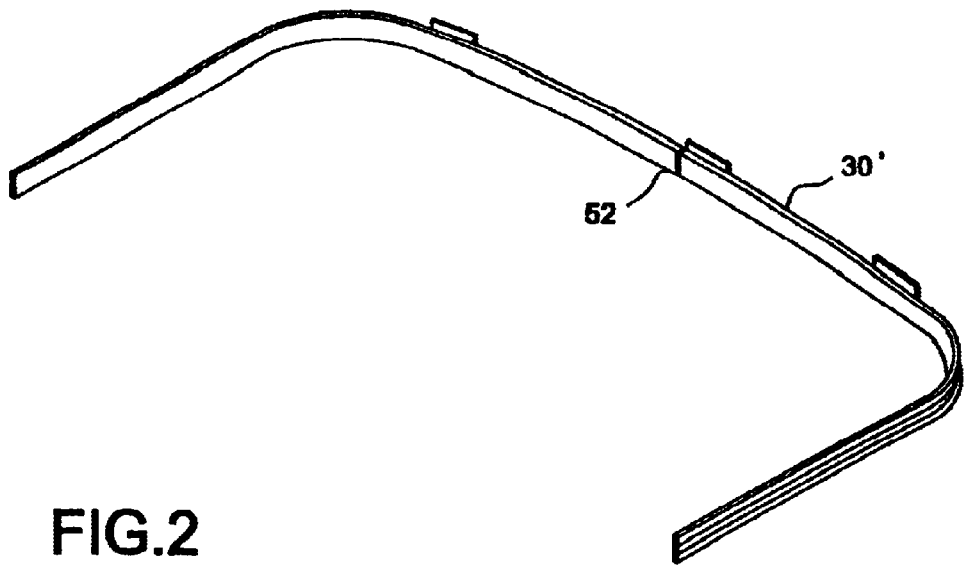
FIG. 2 is an enlarged perspective view of a tack strip according to this invention.

In the form shown in FIGS. 2 & 3, tack strip 30 is a U-shaped flexible member formed of a plastic core 32 that is jacketed by a rolled steel shell 34. In the preferred form shown in FIG. 4, tack strip 30' comprises a unitary glass-filled plastic member with improved flexibility. A 40% glass-filled propylene material has been found useful in this application.

As shown in FIG. 2, tack strip 30' may contain a central notch or weakened section 52 which increases its flexibility or ability to deform for installation, as later described. In either form, tack strip 30 or 30' has at least one metal stop member 38 riveted, screwed or otherwise attached to its rear vertical side after the top cover hem 28 is stapled to it.

As shown in FIGS. 1 and 3, storage compartment 15 includes a water drain or drip trough 40 near its bottom to drain and discharge any water that should enter the compartment. Subjacent opening lip 16, a stop clip 42 is located to mate with each stop member 38 when the top is installed. Stop clip 42 includes a forward lip 44. A spring latch clip 46 is riveted to the body within storage compartment 15 beneath stop clip 42, and has a leg 48 slidable through a slot 50 in the compartment wall to allow the clip 46 to deform.

Topstack 18 is an integrated unit that is installed as a unit into vehicle body 12. Tack strip 30 is stapled to cover hem 28 and hangs loosely from the top stack assembly. It has a generally U-shape and is larger than opening 14. To enable tack strip 30 to be easily inserted through opening 14, it is made sufficiently flexible to be deformed or collapsed inwardly to reduce its size sufficiently to fit through opening 14. After this insertion, tack strip 30 is pushed past spring latch clips 46, which deform to allow passage and then spring back to confine tack strip 30 between it and stop clip 42. Alternatively, spring latch clips 46 can be eliminated and tack strip 30, 30' will be loosely confined between clip 42 and drip trough 40. The ends are then confined by mounting brackets 24 and 26 and all mechanical, hydraulic and electrical connections are made.

Topstack 18 is than unfolded to a fully raised position. The resulting tension in top cover 22 will pull tack strip 30 up into contact with the stop clip 42, which provides an "up" stop and its forward lip 44, which acts as a forward stop to properly tension top cover 22. When topstack 18 is again collapsed for storage in storage compartment 15, spring clips 46, if used, will maintain tack strip 30 in the FIG. 3 position. If the spring clips are not used, the tack strip may fall down into drip trough 40.

Conventional tack strips are made from an aluminum extrusion which mounts a plastic strip for receiving the staples which are used to secure the top cover hem to the tack strip. Due to the variations in vehicle bodies as built, it is common to add various shims to the tack strip to provide a contour that will ensure that the rear of the top cover material has a tight seal against the vehicle body. Such a construction could be used in the instant invention.

However, a better and less expensive tack strip has been developed as part of this invention. Preferred tack strip 30' is a molded unitary 40% glass-filled propylene material, incorporating the various shims, and may have a weakened section 52 (FIG. 2), also termed a "living hinge" incorporated into the molding. This construction enables tack strip 30' to be forced to collapse the U-shape inwardly sufficiently to enable insertion through the constricted body opening 14. As a variant, several weakened sections could be used.

While only preferred embodiments of this invention have been illustrated and described, obvious modifications thereof are contemplated within the scope of the following claims. For example, although three stop members and three mating stop clips are illustrated, one, two or more may be used. Also, although spring clips are illustrated, they may be eliminated, since stop clips and the bracket confinement of the ends of the tack strip will limit upward and forward movement of the tack strips when the top is raised.

We claim:

1. A convertible vehicle having a topstack movable through a body opening between a stored position in a top storage compartment and a raised position, said topstack comprising a collapsible frame mounting a flexible cover which has a rear hem, and a U-shaped tack strip, characterized by the tack strip being secured to the hem and being sufficiently flexible to be partially collapsed to enable insertion through the body opening to install the tack strip, and by including movement limiting means on the body located adjacent the opening for limiting movement of the tack strip on the body when installed to loosely anchor the rear hem and tension the top cover when the top is moved to raised position.

2. The convertible vehicle of claim 1, further characterized by the movement limiting means comprising a stop clip mounted on the body which limits the upward movement of the tack strip when installed.

3. The convertible vehicle of claim 2, further characterized by the stop clip including a forward lip, and further including a stop member mounted on the tack strip for engaging the stop clip to limit upward and forward movement of the tack strip relative to the body when installed.

4. The convertible vehicle of claim 1, further characterized by including a bracket mounted on the body adjacent each end of the tack strip to prevent forward movement of the tack strip when installed.

5. The convertible vehicle of claim 1, further characterized by movement limiting means comprising a stop clip mounted on the body which limits the upward movement of the tack strip when installed, and a spring clip which is deformable to enable movement of the tack strip into engagement with the stop clip and to thereafter trap the tack strip against removal.

6. A flexible tack strip for mounting the rear hem of a convertible top cover to a vehicle body adjacent the upper rim of a body opening that provides access to a top storage compartment, characterized by the tack strip being of a larger dimension than the opening so as to engage the vehicle body adjacent the opening, and being sufficiently flexible to enable deformation of the tack strip to a sufficiently small dimension to enable insertion of the tack strip through the opening.

7. The flexible tack strip of claim 6, further characterized by being made of a glass-filled plastic material.

8. The flexible tack strip of claim 7, further characterized by including a weakened section to facilitate deformation.

9. A method for mounting the rear hem of a convertible topstack to a vehicle body adjacent a body opening, characterized by the steps of a. providing at least one stop member on the vehicle body,
   b. providing a flexible U-shaped tack strip,
   c. securing the hem to the tack strip,
   d. partially collapsing the tack strip and inserting the tack strip through the body opening so as to engage the stop member to limit upward and forward movement of the tack strip when the top is raised.

10. The method of claim 9, further characterized by the steps of e. providing at least one latch on the vehicle body, and
   f. installing the tack strip on the body by engaging the tack strip with the latch to mount the tack strip and anchor the rear hem.

\* \* \* \* \*